(12) United States Patent
Kong (10) Patent No.: US 9,413,420 B1
(45) Date of Patent: Aug. 9, 2016

(54) ADAPTIVE INTERFERENCE REMOVAL FOR COMPRESSIVE SIGNAL DETECTION AND RECONSTRUCTION IN REAL TIME

(75) Inventor: Cathy (Xiangming) Kong, Newbury Park, CA (US)

(73) Assignee: HRL Laboratories, LLC, Malibu, CA (US)

(*) Notice: Subject to any disclaimer, the term of this patent is extended or adjusted under 35 U.S.C. 154(b) by 513 days.

(21) Appl. No.: 13/091,020

(22) Filed: Apr. 20, 2011

(51) Int. Cl.
*H04B 17/00* (2015.01)
*H04B 1/7107* (2011.01)

(52) U.S. Cl.
CPC ................................ *H04B 1/71072* (2013.01)

(58) Field of Classification Search
CPC .................................................. H04B 1/71072
USPC .................................. 455/63.1, 67.11, 67.13
See application file for complete search history.

(56) References Cited

U.S. PATENT DOCUMENTS

| | | | | |
|---|---|---|---|---|
| 5,425,050 | A * | 6/1995 | Schreiber et al. | 375/141 |
| 5,930,310 | A * | 7/1999 | Freeman | 375/346 |
| 7,773,948 | B2 * | 8/2010 | Benjebbour et al. | 455/63.1 |
| 2008/0228446 | A1 | 9/2008 | Baraniuk | |
| 2010/0029213 | A1 * | 2/2010 | Wang | 455/63.1 |
| 2010/0104042 | A1 * | 4/2010 | Benjebbour et al. | 375/285 |
| 2013/0128932 | A1 | 5/2013 | Huang | |

OTHER PUBLICATIONS

E. Candes and T. Tao, Near optimal signal recovery from random projection: universal encoding strategies?, IEEE Trans. on Information Theory 52:5406-5425, 2006.

D.L. Donoho, Compressed sensing, IEEE Trans. on Information Theory, 52:1289-1306, 2006.

Xiangming Kong, Peter Petre, and Roy Matic, An analog-to-information converter for wideband signals using a time encoding machine, Submitted to IEEE 14th DSP Workshop.

Moshe Mishali and Yonina C. Eldar, From theory to practice: Sub-nyquist sampling of sparse wideband analog signals, IEEE Journal of Selected Topics in Signal Processing, 4:375-391, 2010.

Joel A. Tropp, Jason N. Laska, Marco F. Duarte, Justin K. Romberg, and Rochard G. Baraniuk, Beyond Nyquist: efficient sampling of sparse bandlimited signals, IEEE Trans. on Information Theory, 56:520-544, 2010.

From U.S. Appl. No. 14/184,609 (unpublished, non publication requested) filed Feb. 19, 2014, Application and Office Actions.

Xiangming Kong and Mohin Ahmed, "Quick signal detection and dynamic resource allocation scheme for ultra-wideband radar", Proc. SPIE 8021, 802111 (Jun. 21, 2011).

Berger, C. R. and Moura, J. M. F., "Noncoherent compressive sensing with application to distributed radar," 45th. Conf. on Information Sciences & System, (2011), 6 pages.

(Continued)

*Primary Examiner* — Ping Hsieh
(74) *Attorney, Agent, or Firm* — Ladas & Parry (57) ABSTRACT

An adaptive scheme for interference removal in compressive signal detection and reconstruction in real time. When an input signal is composed of a mixture of multiple signals, the signals are detected sequentially according to the signal strength in an iterative way. After one signal is detected, a set of resources is allocated to isolate and process that signal. The isolated signal is removed from the input as interference. The detector proceeds to process the cleaner input and detect another signal, which is also removed. The process continues until all signals are removed. The individual signals which are removed may be subjected to signal processing for analysis purposes.

38 Claims, 7 Drawing Sheets

(56) References Cited

OTHER PUBLICATIONS

Candes, E. and Tao, T., "Decoding by linear programming," IEEE Trans. on Information Theory 51, 4203-4215 (2005).

Candes, E. and Tao, T., "Stable signal recovery from incomplete and inaccurate measurements," Communication on Pure and Applied Mathematics 59, (2006), 15 pages.

Davenport, M. A., Boufounos, P. T., Wakin, M. B., and Baraniuk, R. G., "Signal processing with compressive measurements," IEEE Journal of Selected Topics in Signal Processing 4, 445-460 (2010).

Davenport, M., P., B., and Baraniuk, R., "Compressive domain interference cancellation," Workshop on Signal Proc. with Adaptive Sparse Structured Representations, (2009), 8 pages.

Herman, M. A. and Strohmer, T., "High-resolution radar via compressed sensing," IEEE Trans. on Signal Processing 57(6), 2275-2284 (2009).

U.S. Appl. No. 14/184,609, filed Feb. 19, 2014, Kong.

Adamy, D., [EW101—A First Course in Electronic Warfare], Artech House (2001) (24 pages including table of contents).

From U.S. Appl. No. 14/184,609 (Unpublished, Non-Publication Requested), Final Rejection mailed on Jan. 5, 2016.

Candes, Emmanuel, et al., "Stable Signal Recovery from Incomplete and Inaccurate Measurements," Communications on Pure and Applied Mathematics, vol. LIX, 1207-1223 (2006).

Kong, Xiangming, et al., "An Analog-to-Information Converter for Wideband Signals Using a Time Encoding Machine," pp. 414-419; IEEE, 2011.

Tropp, Joel A., et al., "Beyond Nyquist: Efficient Sampling of Sparse Bandlimited Signals," IEEE Transactions on Information Theory, vol. 56, No. 1, (Jan. 2010), pp. 520-544.

Tropp, Joel A., et al., "Signal Recovery from Random Measurement via Orthogonal Matching Pursuit," IEEE Transactions on Information Theory, vol. 53, No. 12, (Dec. 2007), pp. 4655-4666.

From U.S. Appl. No. 14/184,609 (unpublished; non-publication request filed), Office Action mailed on Jun. 9, 2015.

From U.S. Appl. No. 14/184,609 (unpublished; non-publication request filed), Office Action mailed on Sep. 14, 2015.

* cited by examiner

ADAPTIVE INTERFERENCE REMOVAL FOR COMPRESSIVE SIGNAL DETECTION AND RECONSTRUCTION IN REAL TIME

CROSS REFERENCE TO RELATED APPLICATIONS

None

TECHNICAL FIELD

Disclosed is a new scheme for sampling, detecting and reconstructing analog signals residing in a wide spectrum through compressive sensing in real time. By applying compressive sensing techniques, this scheme is able to detect signals quickly over a very wide bandwidth. Unlike existing compressive sensing approaches which carry out the sampling and reconstruction procedures separately, in this new scheme, the sampling process and the detection/reconstruction process closely interact with one another. In this way, this new scheme offers real-time detection and reconstruction of signals, which is not available using known compressive sensing techniques.

BACKGROUND

Figure 1:
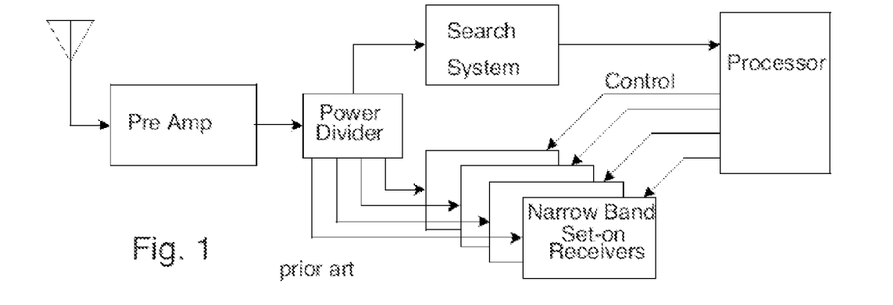
FIG. 1 depicts a prior art receiver structure for searching and processing signals in a wideband system.

A conventional receiver structure in a wideband system covering a range of DC to several tens of Gigahertz is composed of a search system for signal detection and multiple narrowband receivers for signal processing as shown in FIG. 1. Traditional search systems rely on the frequency sweeping approach where a receiver sweeps through frequencies within a range to detect signals. To provide wideband spectral coverage, the search system either uses a channelized approach, where the search receiver is actually made of multiple receivers, each covering a small frequency band, or use one receiver that sweeps through the entire band over a long period. FIG. 1 shows the prior art channelized approach.

Compressive sensing theory (CS) was introduced by Candes (E. Candes and T. Tao, "Near optimal signal recovery from random projection: universal encoding strategies?" *IEEE Trans. on Information Theory*, 52:5406-5425, 2006.) and Donoho (D. L. Donoho, "Compressed sensing", *IEEE Trans. on Information Theory*, 52:1289-1306, 2006). Compressive sensing has been adopted in many applications including signal detection and reconstruction, to save sampling resources. The advantage of applying compressive sensing techniques to signal detection is that compressive sensing measurements incorporate a hologram of the entire spectrum in each measurement. As long as sparsity conditions are met, signals can be detected with far fewer measurements without sweeping through the spectrum.

Figure 2A:
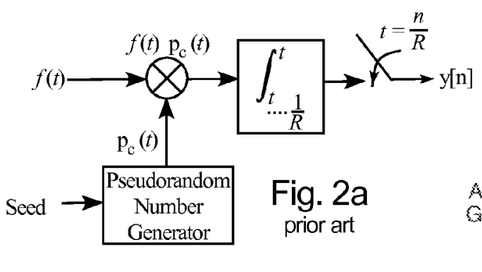
FIGS. 2a, 2b and 2c depict existing approaches for compressively sampling bandlimited analog signals.

For the compressive sensing theory to be applicable, the signal should be sparse (or compressible) in a certain domain and the sampling basis should be incoherent with the sparse domain. When the signal is discrete, random matrices whose entries are made of random numbers identically and independently drawn from a normal distribution or a symmetric Bernoulli distribution are often proposed as the sampling matrices. With a high probability, such sampling matrices are incoherent with most basis of the sparse domain. Hence, compressive sampling and reconstruction techniques can be widely applied to many different types of signals. However, this pure random sampling basis is not applicable for sampling analog signals because they are discrete in nature. Modified versions of the random basis have been proposed to sample analog signals compressively. See, for example:

Joel A. Tropp, Jason N. Laska, Marco F. Duarte, Justin K. Romberg, and Richard G. Baraniuk, "Beyond nyquist: efficient sampling of sparse bandlimited signals", *IEEE Trans. on Information Theory*, 56:520-544, 2010. The input signal is modulated by a pseudorandom sequence and then the modulated signal is integrated and sampled at a regular rate lower than the Nyquist rate, as shown in FIG. 2a.

Figure 2B:
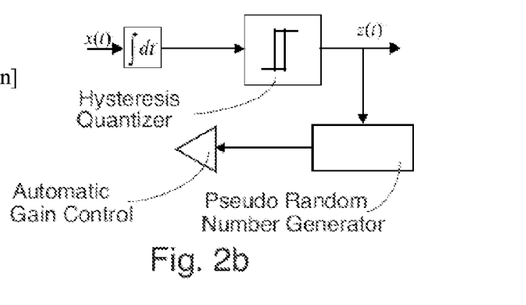
Figure 2C:
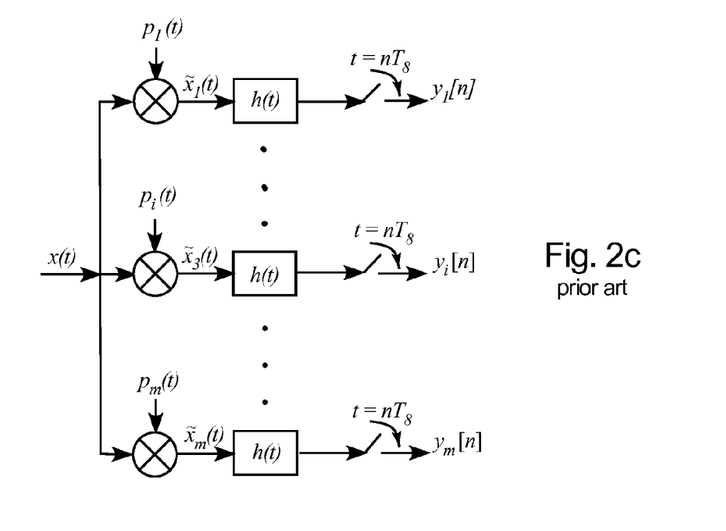

Moshe Mishali and Yonina C. Eldar, "From theory to practice: Sub-nyquist sampling of sparse wideband analog signals", *IEEE Journal of Selected Topics in Signal Processing*, 4:375 391, 2010. This approach takes a similar approach as Tropp in the front end and also modulates the signal by a pseudorandom sequence. The modulated signal passes through a lowpass filter and samples are directly taken from the filtered signal without integrating it, as shown in FIG. 2c Xiangming Kong, Peter Petre, and Roy Matic, "An analog-to-information converter for wideband signals using a time encoding machine", *IEEE 14th DSP Workshop*, pp. 414-419, 2011. This approach takes a different path. It first converts the amplitude information of the signal to time information through a time encoder and measures the time information asynchronously. In converting the signal, the feedback gain in the time encoder is set to be a random sequence to randomize the sampling process. This procedure is illustrated in FIG. 2b.

A common characteristic of these approaches is that the frequency information of the input signal x(t) over the entire sampling period is mixed and measured together in one data bunch. One drawback of this approach is that it can only handle frequency sparse signals, such as input made up of several narrowband signals. But in reality, if we observe the spectrum over a long period, we will find it is seldom sparse as required in these prior techniques. Instead, it is "instantly sparse", i.e. many signals only last a short period and hence only a small portion of the spectrum is occupied in any instant. Strictly speaking, these signal environments are time-frequency sparse. The prior techniques discussed above cannot work effectively in such environments. More importantly, in the prior techniques discussed above, when there are unwanted interfering signals, information from these signals cannot be removed at the sampling stage. Instead, these techniques rely on the reconstruction algorithms to locate the interfering signals, reconstruct them and possibly throw them away in the future. There are two problems associated with this approach. Firstly, due to the existence of the interfering signals (or interference signals), the sparsity of the spectrum reduced. Then to obtain the reconstruction, a large number of measurements need to be collected over a long time period. The overall spectrum over this long time period may not be sparse enough to obtain a good reconstruction. Even if the spectrum remains sparse, the reconstructed interference signals are only accurate to the extent the frequency grids of the representation basis allow. In reality, the frequency band of a signal is usually continuous. Hence, the interference signals cannot be reconstructed accurately and impair the reconstruction quality of other signals as well. The approach in the Mishali paper deals with continuous band directly and is less affected by this problem. However, since the number of measurement channels it requires has to be at least twice as large as the number of signals present, its resource usage efficiency is much lower than the dynamic resource allocation approach disclosed herein.

In this disclosure, a new scheme for sampling time-frequency sparse signal is presented. A compressive sensing technique is applied to the sampling process to reach simultaneous coverage of the entire supported band. Compared to existing compressive sensing approaches, an important feature of this scheme is the addition of an interference removal procedure in the sampling process. By the use of an interference removal procedure in the sampling process, a smaller number of samples are needed to process the input signal than the prior techniques discussed above and has a much lower sparsity requirement on the spectrum. At the same time, resources are allocated to reconstruct a signal preferably only after it is detected and a central frequency is determined. This dynamic resource allocation procedure improves the resource usage efficiency.

A compressive sensing procedure reduces the usage of sampling resource at the price of a complex reconstruction algorithm. Typically the reconstruction algorithm contains iterative optimization procedures. Therefore, another major drawback existing in the current compressive signal detection and reconstruction algorithms is that they cannot do real-time processing due to the need for such iterative optimization procedures. However, in many applications, such as electronic warfare, ability to do real-time processing and to adapt to a highly dynamic environment is critical to the success of an operation. The new scheme presented in this disclosure avoids the complex computation required by existing compressive sensing reconstruction algorithms and process the signal in real time so that it can quickly adapt to highly dynamic environments.

BRIEF DESCRIPTION OF THE INVENTION

The present invention is an adaptive scheme. When the input is composed of a mixture of multiple signals, the signals are detected sequentially according to the signal strength in an iterative way. After one signal is detected, a set of resource is allocated to isolate and process that signal. The isolated signal is then removed from the input as interference. The detector proceeds to process the cleaner input and detect another signal.

In detecting one signal in the input, the signal detector processes the input (with interference removed) in a compressive sensing fashion. It mixes the input with a random sequence and sample the mixed signal at a subnyquist rate. The samples are then projected to a space spanned by a set of sinusoid functions through matrix multiplication. The resulting vector has the same length as the number of sinusoid functions. The maximum entry in this vector corresponds to the sinusoid function whose frequency matches the center frequency of the band occupied by a signal in the input mixture. This center frequency is fed back to the input side and the detected signal can be processed further separately.

To avoid false alarms, each signal's existence is verified by energy thresholding after it is detected. This energy thresholding procedure also serves to detect the completion of the signal's occupation in its current band. After a signal no longer occupies a band, the signal is deemed to be off and the resource allocated to process the signal is returned to the resource pool for future use. In this way, a dynamic spectrum is tracked closely.

BRIEF DESCRIPTION OF THE DRAWINGS

FIGS. 3b and 3b1 depict two embodiments, with greater detail than FIG. 3a of the interference removal block in FIG. 3a.

FIG. 3c is a more detailed diagram of the compressive sensing measurement block in FIG. 3a.

DETAILED DESCRIPTION

The disclosed system is intended to cover very wide bandwidth simultaneously while sampling below Nyquist rate. Let W represent the width of the broadband frequency spectrum covered by the system. The broadband frequency spectrum might extend from essentially a frequency of zero (DC) or nearly zero to some upper limit governed only by ones ability (or inability) to construct exceedingly high frequency electronic circuits. For the moment, let us assume that the broadband spectrum extends from 0 (DC) to 100 GHz. But the broadband frequency spectrum is not limited by this invention, but rather by the user's ability or desire to construct exceedingly high frequency electronic circuits.

Figure 3:
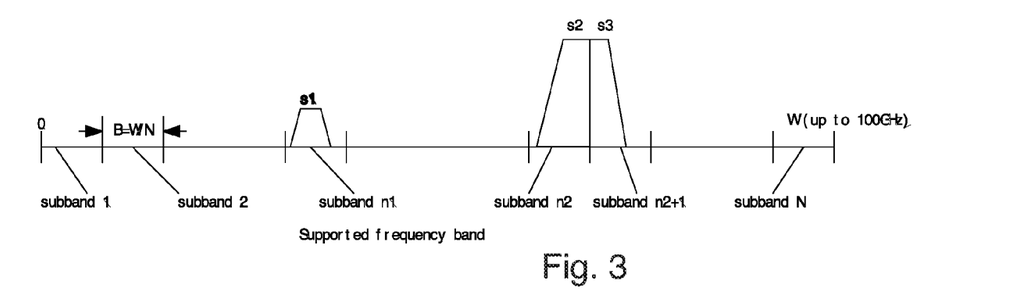
FIG. 3 depicts two exemplary signals in a broadband spectrum and how they might align with narrowband receiver frequencies.

FIG. 3 depicts a frequency spectrum extending form 0 (DC) to 100 GHz with two signals in it. It is divided into N subbands numbered 1 through N, each with width B=W/N. We arbitrarily assume that at most M out of N subbands will be simultaneously occupied at any given moment (this assumption reduces the amount of equipment needed to practice this invention). Signals in each subband will be treated as a different signal. Hence, the input signal x(t) is composed of a mixture of multiple narrowband signals. In FIG. 3 only three subbands are shown as being occupied by a signal. The signal at subbands n2 and n2+1 is wider than W/N and therefore multiple (in this case two) subbands are assigned to it and it is treated as being made up of multiple (two in this case) different signals in the frequency spectrum. The signals in subbands n, n2 and n2+1 comprise an input signal x(t) to the disclosed system. The number of subbands signals in the input signal x(t) may occupy as many as M subbands.

Figure 3A:
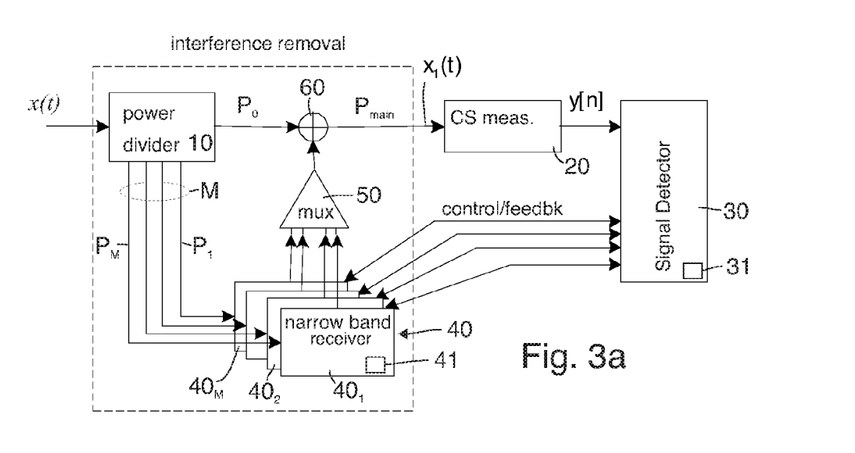
FIG. 3a is a schematic diagram setting forth the architecture of the disclosed system.

At the front end of the system shown in FIG. 3a, the input signal x(t) is divided into M+1 paths by a power divider 10 which preferably divides the power in the input signal x(t) equally to each path P. The first path $P_0$, which is denoted as the main path, and whose major functionality is monitoring the entire spectrum and performing signal detection. In the main path $P_0$, interferences (signals) are removed from the input signal in the compressive sensing measurements block 20. Then the clean input is sampled and processed through a signal detector 30. The other paths $P_1$-$P_M$ are dedicated to process each detected signals individually through an associated narrowband receiver in the set of narrowband receivers $40_1$-$40_M$. The receivers may collectively or individually be identified simply by the number 40 without a subscript when there is no desire to refer to a specific receiver in the set of receivers 40.

The signal detection process follows in an iterative manner. See FIG. 4a for a flow diagram of the steps SD1-SD10 which preferably occur at the signal detector 30 and FIG. 4b for the steps R1-R9 which preferably occur at a receiver 40. Measurements are taken in rounds and the detection process is preferably accomplished using a suitably programmed processor in signal detecter 30. In each round, only one signal (in a given subband) is detected by the signal detector 30, but $N_c$ samples are taken, as described in compressive sampling and dominant signal detection section below. That is why FIG. 4a mentions that "a set of measurements are taken" at step SD1. Then the signal detector 30 reports the center frequency of the subband occupied by the detected signal by a control message to a given one of the narrowband receivers 40 of the set of receivers $40_1$-$40_M$ which is dedicated to isolate this signal. The narrowband receiver 40 first tests whether there is truly a signal in this subband preferably by energy detection (is the energy above some threshold (Thr). The test result is sent back to the signal detector 30 as a feedback message. If there is a signal in the subband, the narrowband receiver assigned to it would preferably process it further. Otherwise, the narrowband receiver in question would preferably wait for further control message from the signal detector as detailed in the Compressive Sampling and Dominant Signal Detection section below. So, after the first round, receiver $40_1$ isolates the first detected interfering signal and, after the second round, receiver $40_2$ isolates the second detected interfering signal and so forth. The isolated signal(s) also occur in the main path $P_0$ (along with all the other signals in x(t)) and they are iteratively removed by a summing node 60. In the next round of measurements, the previously detected signal is subtracted from the input as interference and a new signal will be detected. The subtraction of signals received by the narrowband receivers 40 from the signals (x(t)) on $P_0$ occurs at a subtracting input of the summing node 60 after the signals from the narrowband receivers 40 are combined by a multiplexer 50. The signal $x_1(t)$, after having the signals received by the narrowband receivers 40 subtracted therefrom, occurs on path $P_{main}$. The signal on $P_{main}$ is applied to compressive sensing measurements block 20 which is described in greater detail with reference to FIG. 3c. This process continues until either all signals are removed or the system runs out of receivers 40 since the number of interfering signals must then greater than the number M of receivers 40. Each interfering signal (appearing as signals $s_1(t)$-$s_M(t)$) can be subjected to analysis by a signal processor 44 associated with each receiver. The signals $s_1(t)$-$s_M(t)$ may be digitized and applied to a digital signal processor (DSP) for such analysis and a single DSP can be used with multiple receivers 40, if desired, using well known multiplexing techniques.

Figure 4A:
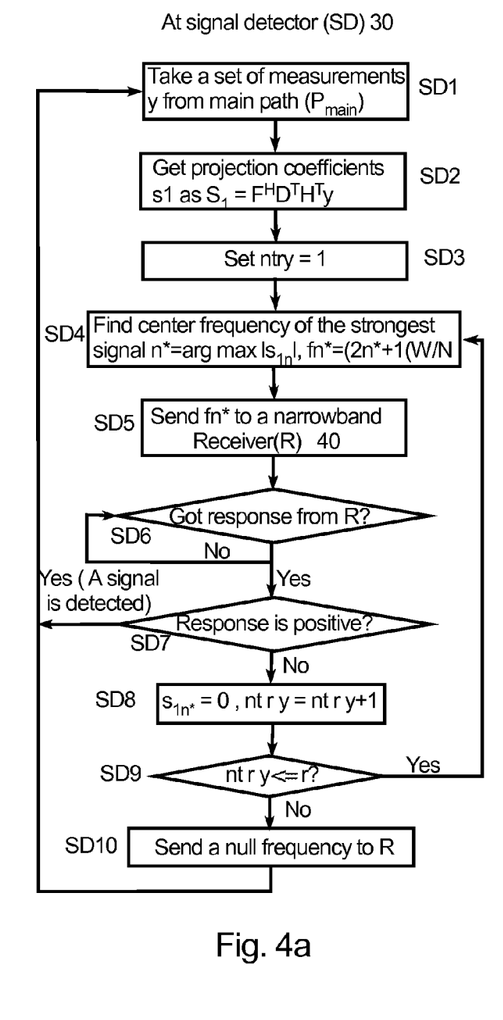
FIGS. 4a and 4b present flow diagrams of the steps which preferably occur at the signal detectors and receivers, respectively.

The a flow diagram of the steps SD1-SD10 of FIG. 4a which preferably occur at the signal detector 30 are preferably implemented by software means (such as a computer program product comprising computer-readable instruction means preferably stored on a non-volatile computer-readable medium that are executable by a CPU of a computer) running on a CPU in or cooperating with signal detector 30. The a flow diagram of the steps R1-R9 of FIG. 4b which preferably occur at receiver 40 are preferably implemented by software means (such as a computer program product comprising computer technology readable instruction means preferably stored on a non-volatile computer technology readable medium that are executable by a CPU of a computer) running on a CPU in or cooperating with receiver 40. So each receiver 40 preferably has a CPU 41 associated therewith and signal detector 30 likewise preferably has a CPU 31 associated therewith. The CPUs 31, 41 are preferably located in their respective receivers 40 and in the signal processor 30, although the CPUs 31, 41 could alternatively be located remotely and, moreover, a single CPU could control multiple receivers 40 and also the signal processor 30, if desired. The non-volatile computer technology readable medium may implemented by a hard disk or other non-volatile memory means such as flash memory or read only memory. The non-volatile computer technology readable medium may be disposed locally at the CPUs 31, 41 or remotely, if desired.

Detailed Description

Dynamic Resource Allocation and Interference Removal

Figure 3B:
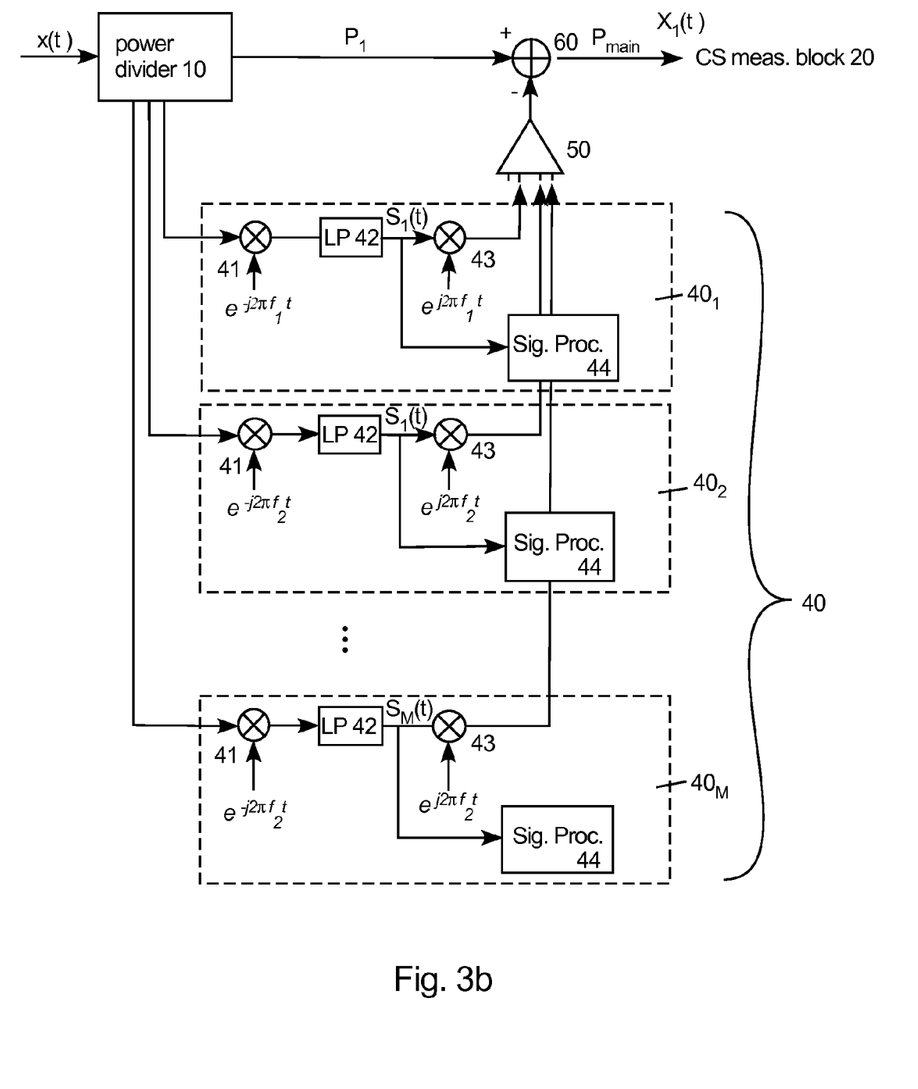
Figure 3B:
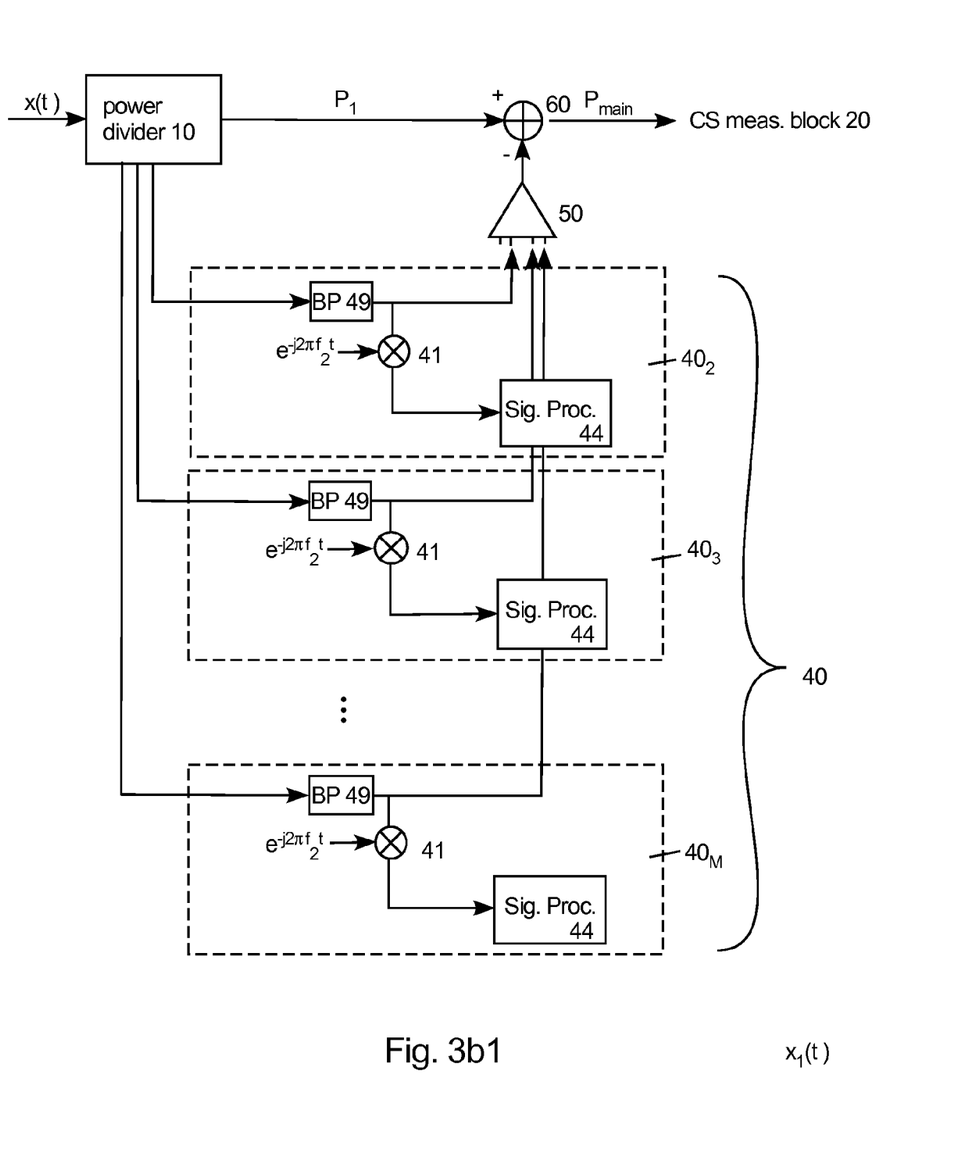

Assume there is an interfering signal residing in the subband centered at $f_1$. After this signal is detected by the signal detector 30, mentioned above, but described in greater detail in the next section, a narrowband receiver 40 is dedicated to measure this signal. The supported bandwidth of the narrowband receiver 40 is W/N, which is equal to width of a subband. See FIGS. 3b and 3b1 which show two different embodiments of one of the narrowband receivers 40 in greater detail. Within a given narrowband receiver 40, the input is preferably first filtered to isolate the signal. To do this, there are two options. First, the signal can directly pass through a bandpass filter 49 to remove all other signals and noise and then be demodulated to baseband by mixing it with a carrier $e^{-j2\pi f_i t}$ at a mixer 41 before applying it to a signal processor 44. This embodiment is shown by FIG. 3b1. However, since a receiver 40 may later be dedicated to process another signal with a different center frequency, it means the bandpass filter 49 should have an adjustable center frequency. This can be difficult to implement. Hence, a second option shown by FIG. 3b is preferably utilized. In the embodiment of FIG. 3b the input is first demodulated to baseband by mixing it with a carrier $e^{-j2\pi f_i t}$ at a first mixer 41. The demodulated signal then passes through a lowpass filter 42 to remove all other signals and noise. The bandwidth of the lowpass filter 42 should preferably be equal to the width of a subband W/N. Then the signal is then modulated back to its original passband through another mixer 43 by a carrier $e^{j2\pi f_i t}$ before being directed to summing node 60 via multiplexer 50. The advantage of this embodiment of FIG. 3b is that all narrowband receivers 40 have the same components except the center frequency of oscillators that generate the carriers. Usually the center frequency is easy to adjust. The modulated signal output from mixer 43 is the same as that in the input to mixer 41, except that it has effectively been bandpass filtered using this technique. Hence, it is fed to the main path where it is subtracted as interference at summing node 60. Therefore, the input to the measurement block $x_1(t)$ no longer contains the isolated signal and hence it will not be detected again. This interfering signal removal technique is preferably carried out as described with reference to the embodiment of FIG. 3b.

Tuning of the narrowband receivers 40 is controlled by the carrier frequency of the two mixers 41, 43 in the narrowband receiver embodiment of FIG. 3b or the bandpass filter 49 in the embodiment of FIG. 3b1. In FIGS. 3b and 3b1, all the signal processors 44 handle the signal at baseband and therefore the signal processors 44 may be separate entities in each receiver 40 or a common signal processor 44 may be used for a number or all receivers 40, if desired.

Sometimes, noise and out-of-band energy of other signals can make an empty band appear to be occupied in the signal detector 30 causing a false detection of an interfering signal (a false alarm). To reduce the false alarm rate, energy detection is preferably performed on the isolated signal, such as the signal $s_1(t)$ in FIG. 3b, through the signal processor 44. If the energy of the "assumed signal" does not pass the aforementioned threshold, a false alarm is asserted and the signal processor would send a negative feedback message to notify the signal detector 30. The signal detector 30 then sends another center frequency to the narrowband receiver. If a null frequency is sent to the receiver 40 instead of another center frequency, the receiver will be stopped and returned to the resource pool for use later. The null is sent at step SD10 and processed by the receiver 40 at step R3. This energy detection procedure also serves another purpose. In a dynamic environment, the detected signal may occupy its current band only for a short period of time. After the interfering signal stops, then the center frequency of the receiver 40 used for that interfering signal will switch to another band (or revert back to the resource pool for later use) and the new signal which the receiver 40 is then tuned to will be treated as a different signal in this system. Through this energy detection procedure, the disappearance of the interfering signal can be quickly detected. When it disappears, the receiver 40 dedicated to that signal will be returned to the resource pool for reuse or immediately assigned to a new interfering signal. In this way, not only is resource utilization efficiency is improved, but this technique also helps avoid adding any extra noise by the narrowband receiver 40 which it might otherwise contribute to the main path $P_{main}$ if left needlessly in use.

Detailed Description

Compressive Sampling and Dominant Signal Detection

Figure 3C:
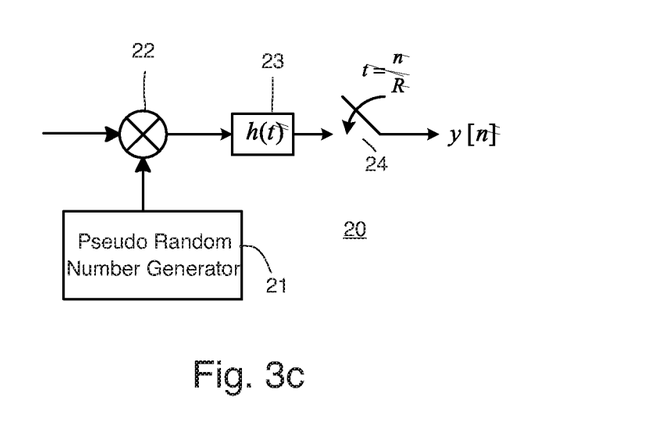
Figure 4B:
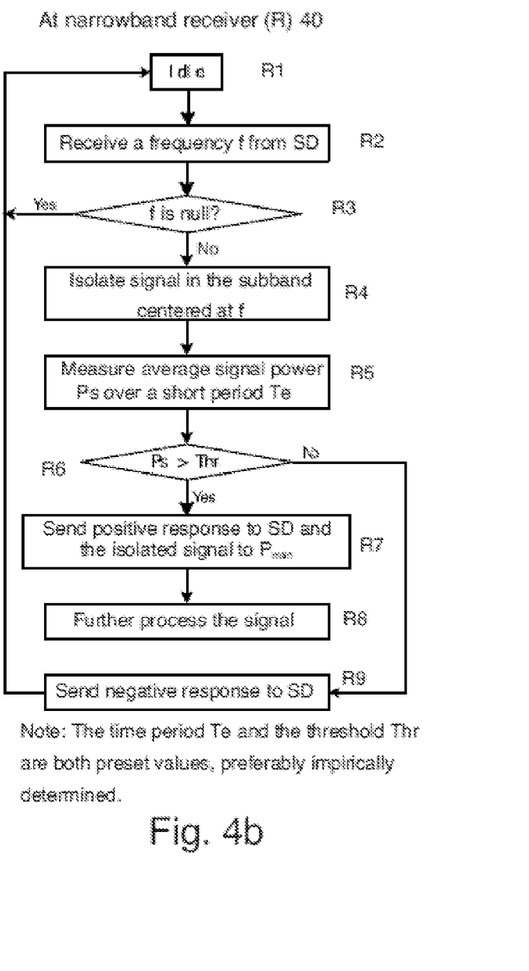

To compressively sample the input in the main path $P_1$, the circuit structure taught by Tropp is adopted and modified. The input in the main path with interfering signals removed is first modulated by a pseudorandom sequence p(t) which has the format $$(t) = p_n, t \in \left[\frac{n}{W}, \frac{n+1}{W}\right] \text{ and } n = 0, 1, L, N \quad \text{(Eqn. 1)}$$

where $p_n$ is a random sequence of ±1 and N is the number of subbands. The modulated signal is lowpass filtered and sampled at a rate R. This rate is lower than the Nyquist rate 2 W and was empirically chosen. The bandwidth of the lowpass filter h(t) should be roughly equal to the bandwidth of a subband. See FIG. 3c which shows a preferred embodiment of the compressive sensing block 20. The pseudorandom sequence p(t) is generated by a pseudorandom number generator 21 and modulated with the signals appearing on $P_{main}$ by a mixer 22. The output of the mixer 21 is applied to a filter 23 having a bandwidth h(t) and thence to a sampling gate or sampler 24. The output y[n] in FIG. 3c corresponds to y in FIG. 4a.

Assume that the entire bandwidth is divided by the sampling rate, i.e. L=W/R is an integer. In the main path, the signal y(t) right before the sampler 24 can be represented as $$y(t) = \int_0^{1/R} x(\tau)p(\tau)h(h-\tau)d\tau, \ 0 \le t < 1/R \quad \text{(Eqn. 2)}$$

$$= \sum_{m=0}^{L-1} p_m \int_{m/W}^{(m+1)/W} x(\tau)h(t-\tau)d\tau$$

Since the bandwidth h(t) of filter 23 is W/N, its value is approximately constant and is close to 1 within the integration period.

Approximating the input signal by N point frequencies as $$x(t) = \sum_{k=-N/2}^{N/2-1} s_n e^{-j\pi t(2k+1)W/N},$$

$s_n$ would have a significant value only at the n's when $e^{-j\pi t(2n+1)W/N}$ is the center frequency of a band occupied by a signal. Following the arguments in the Tropp article referenced above, after $N_c$=N/L samples are taken, the sampled vector y can be expressed as $$y=HDFs \quad \text{(Eqn. 3)}$$

where $$H = \begin{bmatrix} 1 & 1 & 1 & 1 & & & & & \\ & & & & 1 & 1 & 1 & 1 & \\ & & & & & & & 1 & 1 & 1 & 1 \end{bmatrix}, D = \text{diag}(p_n)$$

and $F=[e^{-j\pi n(2k+1)/N}]_{n,k}$ for n=0, 1, ..., N−1 and k=−N/2, −N/2+1, ..., N/2−1. The H here is just an example. The number of 1's in each row is equal to L and the number of rows is equal to the number of samples $N_c$. $N_c$ is the number of samples taken by 24 in each round. Sampling rate of gate 24 is R. L=W/R and $N_c$=N/L. Both variables (L and $N_c$) are defined above.

Instead of separating the sampling and reconstruction process into two stages, the sampling process disclosed herein closely interacts with detection/reconstruction process, resulting in an adaptive procedure. In particular, the entire operation is carried out in an iterative manner. At the beginning, if there is no prior knowledge about the spectrum of the input signal x (t), the input signal x(t) only goes through the main path $P_{main}$ since none of the receivers have been allocated as yet to suppress an interfering signal. A small number of samples are taken. From these samples, the frequency band occupied by the strongest signal is determined by the signal detector 30 of FIG. 3a. A second path is added to measure this signal through a narrowband receiver. Since the strongest signal is being detected first by the signal detector 30 of FIG. 3a, then the first available receiver 40 in the resource pool would be allocated to handle it and that receiver would likely (but not necessarily) be receiver $40_1$. The strongest signal is removed from the input in the main path $P_{main}$ as detailed in the interference removal discussion above. Then another set of samples are taken. From this new set of measurements, the band of the second strongest signal is determined by the signal detector 30 of FIG. 3a. Since the contribution of the first signal has been removed, the new band will be different from that of the first signal. These steps are preferably be repeated until all M narrowband receivers 40 are engaged or all interfering signals are suppressed, whichever occurs first.

As long as the M coefficients in s that have a significant value can be found, the occupied frequency band can be determined and the signals in these bands can be measured using the dedicated channels through Nyquist sampling. Hence, it is not necessary to accurately reconstruct s. So it is not necessary to follow the compressive sensing reconstruction algorithm exactly. Instead, a one-step reconstruction procedure is preferably used as follows:

$$s_1 = F^H D^T H^T y \quad \text{(Eqn. 4)}$$

$$n^* = \underset{n}{\mathrm{argmax}} |s_{1n}|$$

In this one-step reconstruction procedure, the measurements are directly projected to a space spanned by sinusoid functions (see step SD2). The frequency of each sinusoid function equals the center frequency of a subband and can be determined from the index n of the projection coefficients $|s_{1n}|$. The index n* from Eqn. 4 indicates that the band centered at (2n*+1) W/N is occupied by a signal (see step SD4).

A narrowband receiver 40 is allocated to measure this signal and the energy detection procedure detailed in the interference removal discussion above is carried out (see steps SD5-SD6 and steps R1-R9). If a false alarm is asserted, the index of the second largest entry in Isil will be used to determine the occupied band instead of n*. This detection and verification step is preferably repeated at most r times where r is a preset parameter (see steps SD7-SD9). If still no real signal is detected, the signal detector sends (see step SD10) a null frequency to the narrowband receiver 40 being utilized to allow that receiver 40 to stop its operation and be returned to the resource pool or allocated to another interfering signal (see step SD10 and step R3).

Figure 5A:
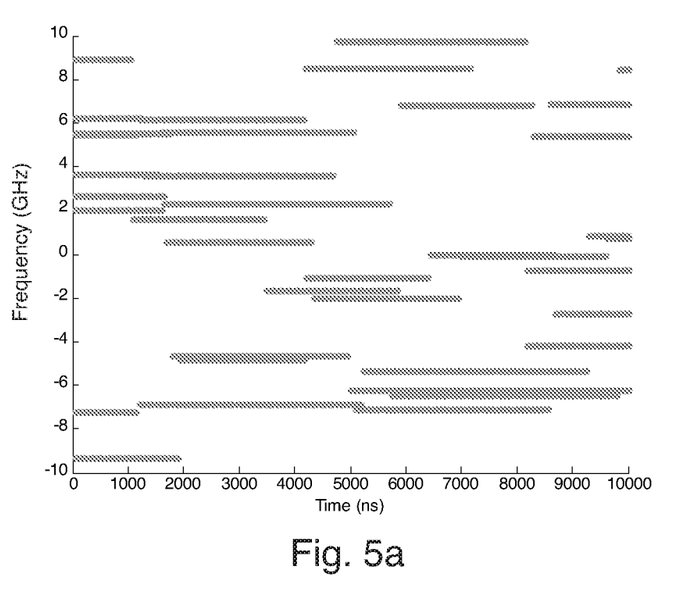
FIG. 5a depicts the time-frequency representation of an input signal in a simulation.
Figure 5B:
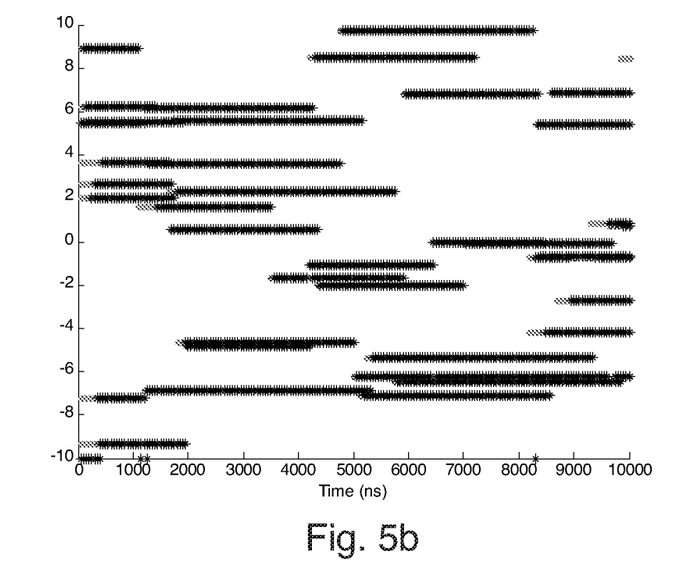
FIG. 5b depicts the detected time-frequency occupation of the input signal of FIG. 5a when there is no noise. The grey lines correspond to the input signal and the dark lines correspond to the detected signal. When a receiver is not used, a dark dot appears on the bottom of the plot for that receiver.

To illustrate the effectiveness of this system, this system was simulated using Matlab on a computer. The simulation environment was set up as follows: the number of simultaneously existing (interfering) signals at any instant M=9, number of subbands N=1000, the entire bandwidth W=20 GHz and the sampling rate of the sampler was 1 GHz. Signals from each band remain in the band for a short while. Then they hop to another band. Each interfering signal has a bandwidth less than or equal 20 MHz, which was randomly chosen. The center frequency, the hopping time and the amplitude of each signal is different and was randomly selected. The simulation time is 10 ms. The time-frequency representation of the signal is given in FIG. 5a. The discernible frequency grid from the Discrete Fourier Transform (DFT) is 10 KHz. If a set of discrete frequency components is used as the basis to approximate the signal, the basis size would be $2 \times 10^5$ and the number of nonzero coefficients for approximating the signal given in FIG. 5a is 4757. The detected time-frequency occupation from all channels over the entire simulation time is plotted in FIG. 5b. From this figure, it can be seen that this technique can quickly detect all the existing signals. When a signal hops from one frequency band to another frequency band, the vacancy of the previous band was detected and new band was located soon after the hopping. In short, this technique closely follows the dynamics of the spectrum.

During the simulation period of 10 ms, 10000 samples were taken. For the same signal, the approach taken in the Tropp article mentioned above requires 1.7K log(WT/K+1) =30425 samples. Obviously, 10000 samples are not enough for this prior art approach to reconstruct the signal. Similarly, to detect and reconstruct the signals in M bands, the approach in the Mishali article requires 2M receivers in total while the system disclosed herein only requires M receivers. Moreover, both prior art approaches assume that the detected frequencies exist on the spectrum all the time, which is typically a false assumption. Although they can use a shorter period to reconstruct, it is generally impossible to divide the entire simulation time into small periods in which every signal existing in that period occupies its band from the beginning to the end of the period because the signals do not hop simultaneously, unless the period is extremely short. With too short a period, neither prior art approach work well either. In fact, for the given type of signal, a time-frequency basis is more proper. However, the time-frequency basis size would be even larger than a pure frequency basis, which means more samples would be needed if existing compressive sensing approaches are utilized.

As a comparison to prior art receiver systems which rely on frequency sweeping for signal detection, for the simulation scenario given above, during the sweeping process, the residing time in each subband is 50 ns (which is inversely proportional to the width of a subband). Then sweeping through the 20 GHz spectrum requires 50 ms in total, which means over the entire simulation time of 10 ms, one round of sweeping cannot be finished, without even considering the need to detect all of the signals.

If there are at most M signals present in the input, after all these signals are detected, the residual in the main path after interference removal block would contain almost no power in the noiseless case. In a static environment, once all interfering signals are detected, the remainder of the measurement from the main channel will contain no signal power after the measurements from receivers 40 are subtracted. In a dynamic environment when an occupied band keeps on changing, the receivers 40 that were allocated to the band which no longer contains any signal power will be return to the resource pool for future use. In this way, the measurement process closely follows the dynamics of the spectrum change and is especially useful for detecting short pulse signals like radar signals.

Since the signals are time limited, according to the fundamental time-frequency relationship, they cannot be completely frequency limited, which means there will be small out-of-band energy. The out-of-band energy, when they are strong enough, may be larger than some very weak signals and cause false alarms. This consideration would limit the dynamic range of the disclosed system, but by adding the energy detection procedure noted above, dynamic range of this system is sufficient to satisfy many applications.

In conclusion, this new sampling scheme is to be used for detecting and reconstructing analog signals spread over a wide bandwidth. The signals are not assumed to be composed of discrete frequencies, which assumption in general is believed to be unrealistic. Instead, the input signal is assumed to occupy several continuous frequency bands. The center frequencies of these bands are detected sequentially. Then the signal component occupying a particular band is isolated and subtracted from the input signal. In this way, signals can be detected in real time. This scheme is especially good for highly dynamic environment when the center frequencies of the signals hop quickly.

Those skilled in the art will appreciate the fact that the term "interfering signal" is not necessarily a signal generated to cause interference, but might well be an information bearing signal which is of interest for further analysis by the signal processors mentioned with reference to FIGS. 3b and 3b1.

The present invention is preferably implemented as an adaptive technique. When the input is composed of a mixture of multiple signals, the signals are detected sequentially according to the signal strength in an iterative way. After one signal is detected, a receiver of a set of receiver resources is allocated to isolate and process that signal. The isolated signal is then removed from the input as interference. The detector proceeds to process the cleaner input and detect another signal.

In detecting one signal in the input, the signal detector processes the input (with interference removed) in a compressive sensing fashion. It mixes the input with a random sequence and sample the mixed signal at a subnyquist rate. The samples are then projected to a space spanned by a set of sinusoid functions. The maximum projection coefficient is located and the frequency of the corresponding sinusoid function is determined. This frequency matches the center frequency of the band occupied by a signal in the input mixture. This center frequency is fed back to the input side and the detected signal can be processed further separately.

To avoid false alarms, each signal's existence is preferably verified by energy thresholding after it is detected. This energy thresholding procedure also serves to detect the completion of the signal's occupation in its current band. After a signal no longer occupies a band, the signal is deemed to be off and the resource allocated to process the signal is returned to the resource pool for future use. In this way, a dynamic spectrum is tracked closely.

This concludes the description including preferred embodiments of the present invention. The foregoing description including preferred embodiments of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A method for detecting a plurality of relatively narrowbanded signals in a relatively widebanded input signal x(t), the plurality of relatively narrowbanded signals having locations in said relatively widebanded input signal x(t) which are not known prior to utilizing said method, the method comprising:
   (i) detecting a first narrowbanded signal in a subband of said input signal x(t) wherein said first narrowbanded signal is more dominant than any other narrowbanded signal in any other subband of said input signal x(t) and determining a center frequency of the subband in which said first narrowbanded signal is detected;
   (ii) utilizing the center frequency and the bandwidth of the subband in which said first narrowbanded signal is detected to remove the first narrowbanded signal from said input signal at a signal summing junction and to produce a cleaner version of the input signal which version corresponds to said input signal x(t) without said first narrowbanded signal at said signal summing junction;
   (iii) repeatedly detecting additional narrowbanded signals in the cleaner version of the input signal and repeatedly utilizing a center frequency and a bandwidth of the subband in which each additional narrowbanded signal to remove the each additional narrowbanded signal from said input signal at said signal summing junction and thereby to produce said cleaner version of the input signal which version corresponds to said input signal x(t) less first narrowbanded signal and less each additional narrowbanded signal as the additional narrowbanded signals are repeatedly detected and removed from said input signal x(t).

2. The method of claim 1 wherein step (iii) is repeated at least until either (1) all of the plurality of relatively narrowbanded signals have been removed from said input signal x(t) or (2) hardware resources to accomplish the removal of the relatively narrowbanded signals are exhausted.

3. The method of claim 1 further including testing for a continued presence of previously detected narrowbanded signals, and if one or more previously detected narrowbanded signals disappears, then hardware resource associated with subtracting those one or more previously detected narrowbanded signals are released and those signals are no longer removed from input signal x(t) to form said cleaner version thereof.

4. The method of claim 3 wherein the released hardware resources are then allocated to other detected narrowbanded signals.

5. The method of claim 1 further including, while repeatedly detecting additional narrowbanded signals, testing whether the additional narrowbanded signals exceed a predetermined energy threshold, and if they do not exceed said predetermined energy threshold, then designating them to be noise and ignoring them rather than removing them from the input signal x(t) in forming said version of the input signal.

6. The method of claim 1 further including subjecting each said narrowbanded signal in said input signal x(t) which is removed therefrom to signal analysis to determine whether the signal is information bearing or interfering and, if information bearing, subjecting the information bearing signal to still further analysis.

7. A method for detecting of a plurality of relatively narrowbanded signals in a relatively widebanded input signal x(t), the method comprising:
   (i) detecting a first narrowbanded signal in said input signal x(t) and determining a center frequency of one or more subbands in which said first narrowbanded signal is detected;
   (ii) utilizing the center frequency and the bandwidth of the one or more subbands in which said first narrowbanded signal is detected to remove the first narrowbanded signal from said input signal and to produce a cleaner version of the input signal which version corresponds to said input signal x(t) without said first narrowbanded signal;
   (iii) repeatedly detecting additional narrowbanded signals in the cleaner version of the input signal and repeatedly utilizing a center frequency and a bandwidth of each additional narrowbanded signal to remove the each additional narrowbanded signal from said input signal and thereby to produce said version of the input signal which version corresponds to said input signal x(t) less first narrowbanded signal and less each additional narrowbanded signal as the additional narrowbanded signals are repeatedly detected and removed from said input signal x(t),
   wherein the steps of detecting the first and additional narrowbanded signals each utilize compressive sampling and dominant signal detection, said compressive sampling and dominant signal detection including:
   (a) mixing the input signal x(t) less all previously detected narrowbanded signals with a random sequence; and
   (b) sampling the mixed signal from step (a) at a subnyquist rate.

8. The method of claim 7 wherein the step of detecting utilizing compressive sampling and dominant signal detection further includes:
   (c) projecting the sampled signal from step (b) to a space spanned by a set of sinusoid functions whereby a maximum projection coefficient is located and the frequency of the corresponding sinusoid function is determined, the frequency of the corresponding sinusoid function being the center frequency is utilized to subtract the narrowbanded signals from the input signal and to produce said version of the input signal which corresponds to said input signal x(t) less first narrowbanded signal and less each additional narrowbanded signal as the additional narrowbanded signals are repeatedly detected and removed from said input signal x(t).

9. A method for allocating hardware resources to the detection of a plurality of relatively narrowbanded signals in a relatively widebanded input signal x(t), the method comprising:
repeatedly detecting narrowbanded signals in the input signal and allocating hardware resources to remove each detected narrowbanded signal from said input signal as it is detected to thereby produce a version of the input signal without the previously detected narrowbanded signals; and
subjecting the version of the input signal without the previously detected narrowbanded signals to both compressive sampling and dominant signal detection, said compressive sampling and dominant signal detection including:
(a) mixing the input signal x(t) less all previously detected narrowbanded signals with a random sequence; and
(b) sampling the mixed signal from step (a) at a subnyquist rate.

10. The method of claim 9 further including ignoring signals which do not exceed a predetermined noise threshold, such signals not being considered as detected narrowbanded signals so that hardware resources used to remove detected narrowbanded signals from the input signal x(t) are not allocated in response to signals which do not exceed said predetermined noise threshold.

11. The method of claim 10 wherein each detected narrowbanded signal is subjected to signal processing after removal from the relatively widebanded input signal x(t).

12. The method of claim 9 wherein hardware resources are allocated to each said narrowbanded signal in said input signal x(t) which is removed therefrom for signal analysis to determine whether the signal is information bearing or interfering and, if information bearing, subjecting each information bearing signal to still further analysis.

13. The method of claim 9 wherein the step of subjecting the version of the input signal without the previously detected narrowbanded signals to both compressive sampling and dominant signal detection further comprises:
(c) projecting the sampled signal from step (b) to a space spanned by a set of sinusoid functions whereby a maximum projection coefficient is located and the frequency of the corresponding sinusoid function is determined, the frequency of the corresponding sinusoid function being the center frequency is utilized to subtract the narrowbanded signals from the input signal and thereby to produce the version of the input signal without the previously detected narrowbanded signals.

14. A method of removing of a plurality of relatively narrowbanded signals in a relatively widebanded input signal, each of the plurality of relatively narrowbanded signals occupying a subband having a center frequency and a bandwidth which are not known in advance of use of the method, the method comprising:
detecting one relatively narrowbanded signal in said relatively widebanded input signal,
determining the center frequency and the bandwidth of the subband in which said relatively narrowbanded signal is detected, and
assigning the center frequency and bandwidth determined for said one relatively narrowbanded signal to one of a plurality of receivers, each of said plurality of receivers having an output coupled to a signal summing junction along with said relatively widebanded input signal to thereby remove said one relatively narrowbanded signal from the relatively widebanded input signal at a signal summing junction before detecting and removing another relatively narrowbanded signal in said relatively widebanded input signal.

15. The method of claim 14 wherein the detecting and removing steps are repeated until all of said plurality of relatively narrowbanded signals are removed from said relatively widebanded input signal.

16. The method of claim 14 wherein only relatively narrowbanded signals which exceed some predetermined power threshold level are removed from said relatively widebanded input signal.

17. The method of claim 14 wherein each said narrowbanded signal in said input signal which is removed therefrom is subjected to signal analysis to determine whether the removed signal is information bearing or interfering and, if information bearing, subjecting the removed information bearing signal to still further signal analysis.

18. A computer program product for processing a plurality of relatively narrowbanded signals in a relatively widebanded input signal data, the computer program product comprising computer technology readable instruction means stored on a non-transitory computer technology readable medium that are executable by a processor for causing the processor to perform operations of:
(i) detecting a first narrowbanded signal in said input signal data and determining a center frequency and a bandwidth of a subband in which said first narrowbanded signal occurs;
(ii) assigning said center frequency and bandwidth of the subband occupied at least in part by said first narrowbanded signal to one of a plurality of receivers, said plurality of receivers each having an signal output which is applied to a signal summing junction along with said input signal data at which the first narrowbanded signal is removed from said input signal data and to produce a cleaner version of the input signal data which version initially corresponds to said input signal data without said first narrowbanded signal;
(iii) repeatedly detecting additional narrowbanded signals in the cleaner version of the input signal and repeatedly utilizing a center frequency and bandwidth of subbands occupied at least one part by each additional narrowbanded signal by assigning the center frequency and bandwidth of subbands occupied at least one part by each additional narrowbanded signal to another one of said plurality of receivers to thereby remove the each additional narrowbanded signal from said input signal and thereby to produce said cleaner version of the input signal data which cleaner version corresponds to said input signal data less first narrowbanded signal and less each additional narrowbanded signal as the additional narrowbanded signals are repeatedly detected and removed from said input signal data.

19. The computer program product of claim 18 wherein step (iii) is repeated according to the computer technology readable instruction means at least until either (1) all of the plurality of relatively narrowbanded signals have been removed from said input signal or (2) an availability of said plurality of receivers to accomplish the removal of the relatively narrowbanded signals is exhausted.

20. The computer program product of claim 18 wherein the steps of detecting the first and additional narrowbanded signals each utilize compressive sampling and dominant signal detection in accordance with the computer technology readable instruction means.

21. The computer program product of claim 20 wherein the step of detecting includes:
(a) mixing the input signal less all previously detected narrowbanded signals with a random sequence;
(b) sampling the mixed signal from step (a) at a subnyquist rate;
(c) projecting the sampled signal from step (b) to a space spanned by a set of sinusoid functions whereby a maximum projection coefficient is located and the frequency of the corresponding sinusoid function is determined, the frequency of the corresponding sinusoid function being the center frequency is utilized to subtract the narrowbanded signals from the input signal and to produce the cleaner version of the input signal data.

22. The computer program product of claim 18 wherein the computer technology readable instruction means include instructions that are executable by the processor for causing the processor to perform operations of testing for a continued presence of previously detected narrowbanded signals, and if one or more previously detected narrowbanded signals disappears, then the one or more receivers of said plurality of receivers associated with subtracting those one or more previously detected narrowbanded signals is released and those signals are no longer removed from input signal x(t) to form said cleaner version thereof.

23. The computer program product of claim 22 wherein the released receivers are then allocated to other detected narrowbanded signals.

24. The computer program product of claim 18 wherein the computer technology readable instruction means include instructions that are executable by the processor for causing the processor to perform operations, while repeatedly detecting additional narrowbanded signals, of testing whether the additional narrowbanded signals exceed a predetermined energy threshold, and if they do not exceed said predetermined energy threshold, then designating them to be noise and ignoring them rather than removing them from the input signal x(t) in forming said cleaner version of the input signal.

25. The computer program product of claim 18 wherein the computer technology readable instruction means perform additional operations of subjecting each said narrowbanded signal in said input signal data which is removed therefrom to signal analysis to determine whether the signal is information bearing or interfering and, if information bearing, subjecting the information bearing signal to still further analysis.

26. A computer program product for allocating hardware resources to the detection of a plurality of relatively narrowbanded signals in a relatively widebanded input signal x(t), the computer program product comprising computer technology readable instruction means stored on a non-transitory computer technology readable medium that are executable by a processor for causing the processor to perform operations of:
repeatedly detecting narrowbanded signals in the input signal and allocating hardware resources to remove each detected narrowbanded signal from said input signal as it is detected to thereby produce a version of the input signal without the previously detected narrowbanded signals; and
subjecting the version of the input signal without the previously detected narrowbanded signals to both compressive sensing measurement and signal detection, said compressive sensing measurement and signal detection including:
(a) mixing the input signal x(t) less all previously detected narrowbanded signals with a random sequence; and
(b) sampling the mixed signal from step (a) at a subnyquist rate.

27. The computer program product of claim 26 further including computer technology readable instruction means for ignoring signals which do not exceed a predetermined noise threshold, such signals not being considered as detected narrowbanded signals so that hardware resources used to remove detected narrowbanded signals from the input signal x(t) are not allocated in response to signals which do not exceed said predetermined noise threshold.

28. The computer program product of claim 26 wherein the step of subjecting the version of the input signal without the previously detected narrowbanded signals to compressive sampling further includes:
(c) projecting the sampled signal from step (b) to a space spanned by a set of sinusoid functions whereby a maximum projection coefficient is located and the frequency of the corresponding sinusoid function is determined, the frequency of the corresponding sinusoid function being the center frequency is utilized to subtract the narrowbanded signals from the input signal and to produce the version of the input signal without the previously detected narrowbanded signals.

29. A computer program product for removing of a plurality of relatively narrowbanded signals in a relatively widebanded input signal, the plurality of relatively narrowbanded signals each having a bandpass located in said relatively widebanded input signal, the bandpasses of the relatively narrowbanded signals occurring at bandpass locations which are not known prior to utilizing said method, the computer program product comprising computer technology readable instruction means stored on a non-transitory computer technology readable medium that are executable by a processor for causing the processor to perform operations of:
detecting one relatively narrowbanded signal in said relatively widebanded input signal and removing said one relatively narrowbanded signal from the relatively widebanded input signal at a signal node before detecting and removing another relatively narrowbanded signal in said relatively widebanded input signal at said signal node; and
subjecting each said narrowbanded signal in said input signal which is removed therefrom to signal analysis to determine whether the signal is information bearing or interfering and, if information bearing, subjecting the information bearing signal to still further analysis.

30. The computer program product of claim 29 wherein the detecting and removing steps are repeated until all of said plurality of relatively narrowbanded signals are removed from said relatively widebanded input signal.

31. The computer program product of claim 29 wherein only relatively narrowbanded signals which exceed some predetermined power threshold level are removed from said relatively widebanded input signal.

32. The computer program product of claim 29 wherein the step of subjecting each said narrowbanded signal in said input signal which is removed therefrom to signal analysis to determine whether the signal is information bearing or interfering further includes:
(c) projecting the sampled signal from step (b) to a space spanned by a set of sinusoid functions whereby a maximum projection coefficient is located and the frequency of the corresponding sinusoid function is determined, the frequency of the corresponding sinusoid function being the center frequency is utilized to subtract the narrowbanded signals from the input signal and to produce the version of the input signal at said signal summing junction which version corresponds to said input signal x(t) without said dominant narrowbanded signal.

33. A method for detecting of a plurality of relatively narrowbanded signals in a relatively widebanded input signal x(t), the method comprising:
   (i) utilizing compressive sampling and dominant signal detection to sense a dominant narrowbanded signal in said input signal and defining a center frequency associated with said dominant narrowbanded signal;
   (ii) utilizing the center frequency and the bandwidth associated with said dominant narrowbanded signal to remove the dominant narrowbanded signal from said input signal and to produce a version of the input signal which version corresponds to said input signal x(t) without said dominant narrowbanded signal;
   (iii) repeatedly utilizing compressive sampling and dominant signal detection to sense additional narrowbanded signals in the input signal and repeatedly utilizing a center frequency and a bandwidth associated with each additional narrowbanded signal to remove the each additional narrowbanded signal from said input signal and thereby to iteratively produce still further cleaner versions of the input signal which versions corresponds to said input signal less said dominant narrowbanded signal and less each additional narrowbanded signal as the additional narrowbanded signals are repeatedly sensed and removed from said input signal; and
   (iv) assigning each sensed narrowbanded signal which is removed from the input signal to a separate narrowband receiver for signal analysis,
   wherein said compressive sampling and dominant signal detection includes:
      (a) mixing the input signal less all previously detected narrowbanded signals with a random sequence; and
      (b) sampling the mixed signal from step (a) at a subnyquist rate.

34. The method for detecting of a plurality of relatively narrowbanded signals in a relatively widebanded input signal according to claim 33 wherein said compressive sampling and dominant signal detection further comprises:
   (c) projecting the sampled signal from step (b) to a space spanned by a set of sinusoid functions whereby a maximum projection coefficient is located and the frequency of the corresponding sinusoid function is determined, the frequency of the corresponding sinusoid function being the center frequency is utilized to subtract the narrowbanded signals from the input signal and to produce the version of the input signal at said signal summing junction which version corresponds to said input signal x(t) without said dominant narrowbanded signal.

35. A computer program product for processing a plurality of relatively narrowbanded signals in a relatively widebanded input signal data, the computer program product comprising computer technology readable instruction means stored on a non-transitory computer technology readable medium that are executable by a processor for causing the processor to perform operations of:
   (i) utilizing compressive sampling and dominant signal detection to sense a dominant narrowbanded signal in an input signal and defining a center frequency associated with said dominant narrowbanded signal;
   (ii) utilizing the center frequency and the bandwidth associated with said dominant narrowbanded signal to assign one of a plurality of receiver to remove the dominant narrowbanded signal from said input signal at a signal summing junction and to produce a version of the input signal at said signal summing junction which version corresponds to said input signal x(t) without said dominant narrowbanded signal;
   (iii) repeatedly utilizing compressive sampling and dominant signal detection to sense additional narrowbanded signals in the input signal and repeatedly utilizing a center frequency and a bandwidth associated with each additional narrowbanded signal to remove the each additional narrowbanded signal from said input signal and thereby to iteratively produce still further cleaner versions of the input signal which versions corresponds to said input signal less said dominant narrowbanded signal and less each additional narrowbanded signal as the additional narrowbanded signals are repeatedly sensed and removed from said input signal; and
   (iv) assigning each sensed narrowbanded signal which is removed from the input signal to a separate narrowband receiver for signal analysis,
   wherein said compressive sampling and dominant signal detection comprises:
      (a) mixing the input signal less all previously detected narrowbanded signals with a random sequence; and
      (b) sampling the mixed signal from step (a) at a subnyquist rate.

36. A method for detecting of a plurality of relatively narrowbanded signals in a relatively widebanded input signal x(t), the widebanded input signal x(t) comprising a plurality of signals some of which are information bearing and others of which are interfering, the method comprising:
   (i) detecting a first narrowbanded signal in said input signal x(t) and determining a center frequency of a subband associated with said first narrowbanded signal;
   (ii) utilizing the center frequency and the bandwidth of the subband associated with said first narrowbanded signal to remove the first narrowbanded signal from said input signal and to produce a version of the input signal which version corresponds to said input signal x(t) without said first narrowbanded signal;
   (iii) repeatedly detecting additional narrowbanded signals in the input signal and repeatedly utilizing a center frequency and a bandwidth of the subband associated with each additional narrowbanded signal to remove the each additional narrowbanded signal from said input signal and thereby to produce further versions of the input signal which versions corresponds to said input signal x(t) less first narrowbanded signal and less each additional narrowbanded signal as the additional narrowbanded signals are repeatedly detected and removed from said input signal x(t); and
   (iv) subjecting each said narrowbanded signal in said input signal x(t) which is removed therefrom to signal analysis to determine whether the signal is information bearing or interfering and, if information bearing, subjecting the information bearing signal to still further analysis.

37. A method of increasing the sparsity of a plurality of relatively narrowbanded signals in a relatively widebanded input signal, the plurality of relatively narrowbanded signals each having a bandpass located in said relatively widebanded input signal, the bandpasses of the relatively narrowbanded signals occurring at bandpass locations which are not known prior to utilizing said method, said method comprising:
   dividing the entire widebanded input signal into a plurality of subbands,
   examining subbands with relatively narrowbanded signals therein, and
   if upon examination one or more subbands contain relatively narrowbanded signals are determined to be non-information bearing, then removing the non-information bearing relatively narrowbanded signals from said relatively widebanded input signal.

38. The method of claim 37 wherein the step of examining subbands with relatively narrowbanded signals therein includes spreading the relatively narrowbanded signals by mixing them with pseudo-random data.

* * * * *